Patented Jan. 16, 1945

2,367,287

UNITED STATES PATENT OFFICE 2,367,287

HYDROGENATION PROCESS

William J. Kirkpatrick, Marshallton, Del., assignor to Hercules Powder Company, Wilmington, Del., a corporation of Delaware No Drawing. Application April 9, 1941,
Serial No. 387,662

11 Claims. (Cl. 260—100)

This invention relates to an improved method for the hydrogenation of unsaturated compounds. It particularly relates to an improved method for the hydrogenation of unsaturated compounds wherein a noble metal is employed as a catalytic agent.

Noble metal catalysts have been of great interest in hydrogenation processes for some time past. However, their development has never reached the point where they could be used successfully in large-scale liquid phase hydrogenations. This has been primarily caused by the great cost of operations employing noble metals. The high cost of these operations can be allocated to several different sources. Thus, it has been found that there is often an undue loss of noble metal in the preparation of the catalyst. Also, depending upon the support employed in making the catalyst, there may be experienced great difficulty in recovering the catalytic material from the support. Furthermore, during the hydrogenation process, it is known that a considerable quantity of the noble metal is carried away in colloidal form along with the material being hydrogenated. This colloidal noble metal cannot be removed by any simple and inexpensive means such as filtration, settling, etc.

It is the last problem with which the present invention is concerned. With this condition existing in a hydrogenation process, there are several alternative procedures which might be followed. The colloidal catalyst might be left to remain in the hydrogenated material. The product, however, would be an impure one and although unobjectionable from that point of view for many uses, it would be objectionable in some of its applications. It is, on the other hand, possible to remove the colloidal noble metal from the product but this is in many cases a very expensive procedure. For example, colloidal noble metal is only difficultly recoverable from hydrogenated resinous materials such as hydrogenated rosin. Another alternative, and one which is most desirable, is to employ a process of hydrogenation wherein practically none of the noble metal assumes the colloidal state during the process.

It is an object of this invention to provide a method for the hydrogenation of unsaturated materials wherein a noble metal catalyst is employed which can be utilized without any substantial loss of noble metal therein.

It is a further object of this invention to provide a method for the hydrogenation of unsaturated materials wherein a noble metal catalyst is employed which will yield a product which is substantially free of noble metal in colloidal form.

Still further objects will appear hereinafter.

It has been found that, in carrying out the hydrogenation of an unsaturated organic material or its solution, a noble metal catalyst employed therein tends to become colloidal when there is present in the material or its solution a small amount of ketones, aldehydes or peroxides. Where these compounds are present essentially as impurities, it is impossible to recover the noble metal in substantial quantities by simple and inexpensive methods, such as, filtration, settling, etc. The particles of noble metal are colloidally dispersed in the unsaturated organic material or its solution and defy removal by any simple and convenient method.

Now, it has been further found that when a small amount of water is added to the unsaturated organic material or its solution, substantially none of the noble metal goes into colloidal dispersion during the hydrogenation process. Hence, the noble metal catalyst can be recovered substantially completely from the unsaturated organic material or its solution by a simple process such as filtering, settling, etc. It is, of course, required in order to carry out the present process that the unsaturated organic material or its solution be at least partially water-miscible. Thus, it has been found that the improved results of this invention are obtained when an amount of water within the range of from about 0.1% to about 5.0%, based upon the liquid phase being subjected to hydrogenation, is employed. Preferably, however, an amount of water within the range of from about 0.2% to about 2.5%, based upon the liquid phase being subjected to hydrogenation, is employed. Most preferably, about 2.5% water, based upon the liquid phase being subjected to hydrogenation, will be employed.

The processes of this invention may be employed in the hydrogenation of any unsaturated organic material or its solution where there are present relatively small amounts of ketones, aldehydes or peroxides essentially as impurities. Thus, the processes have no application to the hydrogenation of materials which contain relatively large quantities of ketones, aldehydes, or peroxides where the primary object is to hydrogenate said compounds to produce the corresponding derivatives. Specifically, the processes of this invention are concerned with only those unsaturated organic materials, which contain or whose solutions contain a total amount of compounds in the form of ketones, aldehydes or peroxides, not greater than about 5.0%, based on the liquid being hydrogenated. These impurities in the form of ketones, aldehydes, and peroxides referred to above are usually formed as a result of the oxidation of the unsaturated materials at their unsaturated centers. This oxidation reaction takes place at rather low temperatures, for example, at room temperature and at temperatures which vary thereabove or below by 100° C. The oxygen is believed to first react at the double bonds forming peroxides. These oxygenated compounds may under certain conditions be converted into ketones and aldehydes, with the larger molecules finally splitting up to form simpler molecules. The result of the oxidation and decomposition reactions is the presence in the material of compounds containing peroxide, aldehyde and ketone groups; and it is to unsaturated materials containing these compounds that this invention has application. Although normally, the peroxide, aldehyde, or ketone compounds will arise due to oxidation of the unsaturated material, they may be introduced during the preparation or refining of the material, for example, this is often the case in the preparation of the acetylenic glycols. Finally, there is a possibility of their introduction into the liquid being hydrogenated by their presence in the solvent employed.

In accordance with the foregoing, the following unsaturated organic materials may be hydrogenated employing the improved processes of this invention. Thus, for example, there may be employed rosin or rosin derivatives, such as, wood rosin, gum rosin, rosin acids, as abietic acid, pimaric acid, sapinic acid, esters of rosin, esters of rosin acids, resin alcohols, as abietyl alcohol, pimaryl alcohol, etc.; fats and fatty acids, such as, linseed, corn, cotton, peanut, and fish oils, oleic, elaidic, linolic, linolenic, linoleic, eleostearic, erucic acids and their esters, etc.; terpenes and sesquiterpenes, such as, menthene, pinene, azulene, camphene, dipentene, terpinolene, cadalene, myrcene, allo-ocimene, etc.; terpene alcohols, such as, alpha-terpineol, beta-terpineol, gamma-terpineol, Ngaiol, isopulegol, borneol, menthol, carvomenthol, etc.; the acetylenic glycols, such as, (2,5-dimethyl-3-hexyne-2,4-diol), (2-butyne-1,4-diol), (3-hexyne-2,5) diol), (3,6-dimethyl-4-octyne-3,6-diol), (2,7-dimethyl-4-octyne-3,6-diol), etc.; ethylenic glycols, such as, (2,5-dimethyl-3-hexene-2,4-diol), (2-butene-1,4-diol), (3-hexene-2,5-diol), (3,6-dimethyl-4-octene-3,6-diol), (2,7-dimethyl-4-octene-3,6-diol), etc.

The improved processes of the invention are of particular significance in the hydrogenation of materials containing the hydrocarbon nucleus of a rosin acid, inasmuch as these materials generally contain small amounts of aldehydes, ketones or peroxides and hence cause noble metal catalysts to become colloidal during hydrogenation. These materials containing the hydrocarbon nucleus of a rosin acid and their solutions have a peculiarly strong tendency to retain noble metal in the colloidal form once it has assumed that form as a consequence of the hydrogenation process. For convenience, materials containing the hydrocarbon nucleus of a rosin acid will hereinafter be referred to as "rosinyl" compounds. Rosinyl compounds thus comprise both wood and gum rosin; the acids obtainable therefrom, such as, pimaric, sapinic, sylvic, abietic, etc.; esters of a rosin acid with a monohydric or polyhydric alcohol, such as, methyl abietate, ethyl abietate, glycerol abietate, pentaerythritol abietate, etc.; the alcohols produced by the reduction of the carboxyl group of a rosin acid, such as, abietyl alcohol, pimaryl alcohol, etc.; the esters of these alcohols, etc.

Various solvents may, if desired, be employed in practicing the invention. It is required, however, that the resulting solution be miscible with water to the extent indicated heretofore. It is not required that a solvent be employed in the process. However, in the event no solvent is used, it is required that the material being hydrogenated be miscible with water to the extent indicated heretofore.

If it be desired to use a solvent in the process, or if a solvent is required, the following may be employed. Organic acids, such as, acetic, propionic, butyric, isobutyric, valeric, etc.; alcohols, such as, methyl, ethyl, propyl, isopropyl, n-butyl, secondary butyl, amyl, cyclohexyl, etc.; ethers, such as, dimethyl ether, ethyl methyl ether, diethyl ether, dipropyl ether, diisopropyl ether, ethyl propyl ether, etc.; esters, such as, methyl acetate, ethyl acetate, ethyl propionate, isopropyl acetate, methyl propionate, isopropyl propionate, etc.; hydrocarbons, such as, 2,2,3,3 tetramethyl butane, neo-pentane, 2,2,3,3,4,4 hexamethyl pentane, 2,3 dimethyl butane, etc., may be so employed. Also, mixed solvents may be employed. A particular solvent mixture which I have found to produce excellent results is one containing from 50 to 65 parts of acetic acid, from 35 to 60 parts of isopropyl ether and from 0.5 to 5.0 parts of isopropyl alcohol.

It is quite obvious that the improvement of this invention has application only to those processes where a non-colloidal noble metal catalyst is employed at the outset of the process. Noble metal catalysts which may be employed consist of the members of the group comprising iridium, ruthenium, rhodium, platinum, osmium, and palladium. It is contemplated that their oxides be considered as equivalents. Hence, where the term noble metal catalyst is referred to in this specification and claims, a catalyst which contains a noble metal in either the elemental or combined form is meant. Furthermore, these catalysts may be employed in supported or unsupported form. The supported catalyst may be in massive form, particularly where it is to be used in continuous process hydrogenation.

More specifically, any noble metal catalyst which is prepared by electrolysis may be employed in the hydrogenation process with which this invention is concerned. Also, any noble metal catalyst prepared by the fundamental reaction of a noble metal compound and an alkali metal nitrate at an elevated temperature may be employed therein. Thus, the unsupported noble metal catalyst prepared according to Vorhees and Adams, J. A. C. S. 44, 1397 (1922) and described with greater particularity by Adams and Shriner in J. A. C. S. 45, 2171 (1923), etc. may be employed. Furthermore, any supported catalyst comprising the product of the reaction of a noble metal compound and an alkali metal nitrate may be employed in the hydrogenation process of this invention. For example, the supported catalyst of U. S. Patent 2,207,868, Serial No. 753,133, issued July 16, 1940 to Robert W. Martin, may be employed. Additional examples of a supported noble metal oxide catalyst are claimed in my co-pending application for U. S. Letters Patent, Serial Number 370,797, filed December 19, 1940, now U. S. Patent 2,331,915.

Returning to the processes of the present invention, any of the aforesaid noble metal hydrogenation catalysts may be employed therein. The catalyst will be employed in active form. Thus, if the catalyst used contains the noble metal in the form of the oxide, it will be reduced to the noble metal with hydrogen before or during use.

In carrying out the hydrogenation process in accordance with the present invention, the liquid being hydrogenated is contacted with a suitable active noble metal catalyst in the presence of hydrogen. The temperature and pressure used in the hydrogenation may be varied widely. Thus, the temperature employed may be within the range of from about 0° C. to about 150° C., preferably, however, within the range of from about 15° C. to about 50° C.; while the pressure employed may be within the range of from about 1 to about 500 atmospheres, preferably, however, within the range of from about 3 to about 50 atmospheres.

Hydrogenation may be accomplished in accordance with this invention by either batch or continuous processes. If continuous process hydrogenation is employed, however, the catalyst is placed in a suitable supporting vessel and the material to be hydrogenated is circulated in liquid phase past the catalyst in the presence of hydrogen. Desirably, the stream of hydrogen will also be caused to flow past the catalyst and in such cases the flow of hydrogen may be either concurrent with or, countercurrent to the flow of material being hydrogenated. Uniform distribution of the material over the catalyst, may be effected by spraying it, atomized by a current of hydrogen from a suitable nozzle.

There follow specific examples which illustrate several ways in which the principles of the invention have been demonstrated but they are not to be taken as exclusive or limiting in any way. All parts and percentages in the specification and claims unless otherwise indicated are by weight.

Example 1

Twenty-five parts of N wood rosin were dissolved in a solvent consisting of 97.5 parts of glacial acetic acid and 2.5 parts of water in a kettle equipped with means for agitation and means for maintaining an atmosphere free of oxygen. The resulting solution was placed in a hydrogenation vessel which likewise contained no oxygen. An amount of platinum oxide catalyst supported on true tripoli was added so that one part of platinum was present for each 100 parts of rosin. Hydrogen was introduced under a pressure of 4 atmospheres and agitation started. A temperature of 25 to 50° C. was maintained. After 10 minutes had elapsed, the contents of the vessel were withdrawn and filtered through a fine grain paper (Whatman's No. 50). The solvent was removed by steam and vacuum distillation and the hydrogenated rosin poured at 145° C. The product was very light colored, substantially better than X on the rosin color scale, showing a saturation of 70% based on abietic acid having two double bonds per molecule, and contained less than 0.5 part per million of platinum as determined by a spectrographic analysis.

Example 2

Twenty-five parts of N wood rosin were dissolved in a solvent consisting of 60 parts of acetic acid, 55 parts of isopropyl ether, 0.5 part of water and 5.0 parts of isopropyl alcohol in a kettle equipped as in Example 1. The resulting solution was treated exactly in accordance with the procedure of Example 1. The hydrogenated rosin obtained had a color better than X on the rosin color scale and showed a saturation of 70% of the theoretical based on abietic acid having a molecular weight of 302 and containing two double bonds per molecule. A spectrographic analysis of the product showed it to contain less than 0.5 part per million of platinum as determined by a spectrographic analysis.

Example 3

Twenty-five parts of the glycerol ester of N wood rosin were dissolved in a solvent consisting of 60 parts of acetic acid, 55 parts of isopropyl ether, 0.5 part of water and 5.0 parts of isopropyl alcohol in a kettle equipped as in Example 1. An amount of platinum oxide catalyst supported on true tripoli was added so that one part of platinum was present for each 100 parts of the ester. Hydrogen was introduced under a pressure of 4 atmospheres and agitation started. A temperature of 25 to 50° C. was maintained. At the end of a 30-minute period, the contents of the vessel were filtered through a fine grained Whatman's No. 50 filter paper. The solvent was removed by steam and vacuum distillation and the hydrogenated material poured at 145° C. The product had a color better than X on the rosin scale and was saturated to the extent of 70% based on the theoretical for pure glycerol tri-abietate. A spectrographic analysis showed that it contained less than 0.5 part per million of platinum.

Example 4

Twenty-five parts of commercial dipentene containing 75% dipentene and 25% para-cymene were dissolved in a solvent consisting of 72.5 parts of glacial acetic acid and 2.5 parts of water in a kettle equipped with means for agitation and means for maintaining an atmosphere free of oxygen. The resulting solution was placed in a hydrogenation vessel which likewise contained no oxygen. An amount of platinum oxide catalyst supported on true tripoli was added so that one part of platinum was present for each 100 parts of dipentene. Hydrogen was introduced under a pressure of 4 atmospheres and agitation started. A temperature of 25 to 50° C. was maintained. After 30 minutes had elapsed, the contents of the vessel were withdrawn and filtered through Whatman's No. 50 paper. The acetic acid was washed out with water to yield a product water-white in color. It contained dipentene saturated to the extent of 68% of the theoretical based on dipentene having two double bonds per molecule. A spectrographic analysis showed the product to contain less than 0.5 part per million of platinum.

Example 5

Twenty-five parts of corn oil were dissolved in a solvent consisting of 72.5 parts of glacial acetic acid and 2.5 parts of water in a kettle equipped with means for agitation and means for maintaining an atmosphere free of oxygen. The resulting solution was placed in a hydrogenation vessel which likewise contained no oxygen. An amount of platinum oxide catalyst supported on true tripoli was added so that one part of platinum was present for each 100 parts of corn oil. Hydrogen was introduced under a pressure of 4 atmospheres and agitation started. A temperature of 30 to 60° C. was maintained. After 30 minutes had elapsed, the contents of the vessel were withdrawn and filtered through Whatman's No. 50 paper. The filtration was carried out at a temperature just high enough to melt the fat which was no longer immiscible with the acetic acid. The solvent was washed out with water and the last traces of water removed by heating in vacuo. 1.63% hydrogen was absorbed and the iodine number of the corn oil had been reduced from 148 to 0. The product was a hard white fat and contained less than 0.2 part per million of platinum as determined by a spectrographic analysis.

*Example 6*

Twenty-five parts of alpha-terpineol were dissolved in a solvent containing 72.5 parts acetic acid and 2.5 parts of water in a kettle equipped with means for agitation and means for maintaining an atmosphere free of oxygen. The resulting solution was placed in a hydrogenation vessel which likewise contained no oxygen. An amount of platinum oxide catalyst supported on true tripoli was added so that one part of platinum was present for each 100 parts of alpha-terpineol. Hydrogen was introduced under a pressure of 4 atmospheres and agitation started. A temperature of 25 to 50° C. was maintained. After 30 minutes had elapsed, the contents of the vessel were withdrawn and filtered through a fine grained Whatman's No. 50 filter paper. The product was very light in color showing a saturation of 23.6% based on alpha-terpineol having two double bonds per molecule. It contained less than 0.5 part per million of platinum as determined by a spectrographic analysis.

By the careful use of the processes of this invention, hydrogenation can be safely carried out practically without the loss of any noble metal as a consequence of the hydrogenation process. The products obtained are light in color and are further characterized by their being substantially free of colloidal noble metal. Thus, when rosin is hydrogenated, using these new processes in conjunction with a supported active platinum catalyst, products are obtained which contain less than 0.5 part per million of platinum as determined by a spectrographic analysis.

By "non-colloidal" as used in the specification and claims attached, there is contemplated particles of such a size that they can be removed from a liquid containing the same, by the use of a Whatman's No. 50 filter paper.

It will be understood that the details and examples hereinbefore set forth are illustrative only and that the invention as broadly described and claimed is in no way limited thereby.

What I claim and desire to protect by Letters Patent is:

1. The process of hydrogenation of rosin containing a small proportion of not more than 5% of an impurity selected from the group consisting of aldehydes, ketones, and organic peroxides, which comprises reacting the rosin, dissolved in an organic solvent to produce an at least partially water-miscible liquid phase, and hydrogen, in contact with a non-colloidal noble metal catalyst, in the presence of water which is dissolved in the aforesaid at least partially water-miscible liquid phase, the water being present in an amount within the range of from about 0.1% to about 5.0% based on the solution, and recovering said noble metal catalyst.

2. The process of hydrogenation of rosin containing a small proportion of not more than 5% of an impurity selected from the group consisting of aldehydes, ketones, and organic peroxides, which comprises reacting the rosin, dissolved in an organic solvent to produce an at least partially water-miscible liquid phase, and hydrogen, in contact with a non-colloidal noble metal catalyst, in the presence of water which is dissolved in the aforesaid at least partially water-miscible liquid phase, the water being present in an amount within the range of from about 0.2% to about 2.5% based on the solution, and recovering said noble metal catalyst.

3. The process of hydrogenation of rosin containing a small proportion of not more than 5% of an impurity selected from the group consisting of aldehydes, ketones, and organic peroxides, which comprises reacting the rosin, dissolved in acetic acid, and hydrogen, in contact with a non-colloidal noble metal catalyst, in the presence of water which is dissolved in the acetic acid solution, the water being present in an amount within the range of from about 0.1% to about 5.0% based on the solution, and recovering said noble metal catalyst.

4. The process of hydrogenation of rosin containing a small proportion of not more than 5% of an impurity selected from the group consisting of aldehydes, ketones, and organic peroxides, which comprises reacting the rosin, dissolved in acetic acid, and hydrogen, in contact with a non-colloidal noble metal catalyst, in the presence of water which is dissolved in the acetic acid solution, the water being present in the amount of 2.5% based on the solution, and recovering said noble metal catalyst.

5. The process of hydrogenation of rosin containing a small proportion of not more than 5% of an impurity selected from the group consisting of aldehydes, ketones, and organic peroxides, which comprises reacting the rosin, dissolved in acetic acid, and hydrogen, in contact with a non-colloidal platinum catalyst, in the presence of water which is dissolved in the acetic acid solution, the water being present in the amount of 2.5% based on the solution, and recovering said noble metal catalyst.

6. The process of hydrogenation of rosin containing a small proportion of not more than 5% of an impurity selected from the group consisting of aldehydes, ketones, and organic peroxides, which comprises reacting the rosin, dissolved in a solvent comprising 50 to 65 parts of acetic acid, 35 to 60 parts of isopropyl ether and 0.5 to 5.0 parts of isopropyl alcohol, with hydrogen, in contact with a non-colloidal noble metal catalyst, in the presence of water which is dissolved in the rosin solution, the water being present in the amount of between about 0.2% and about 2.5% based on the solution, and recovering said noble metal catalyst.

7. The process of hydrogenation of an unsaturated organic material containing the hydrocarbon nucleus of a rosin acid compound possessing solubility in an organic solvent, said material containing a small proportion of not more than 5% of an impurity selected from the group consisting of aldehydes, ketones, and organic peroxides, which comprises reacting said organic compound, dissolved in an organic solvent to produce an at least partially water-miscible liquid phase, and hydrogen, in contact with a non-colloidal noble metal catalyst, in the presence of water which is dissolved in the aforesaid at least partially water-miscible liquid phase, the water being present in an amount within the range of from about 0.1% to about 5.0% based upon the solution, and recovering said noble metal catalyst.

8. The process of hydrogenation of an unsaturated organic material containing the hydrocarbon nucleus of a rosin acid compound possessing solubility in an organic solvent, said material containing a small proportion of not more than 5% of an impurity selected from the group consisting of aldehydes, ketones, and organic peroxides, which process comprises reacting said organic compound, dissolved in an organic solvent to produce an at least partially water-miscible liquid phase, and hydrogen, in contact with a non-colloidal noble metal catalyst, in the presence of water which is dissolved in the aforesaid at least partially water-miscible liquid phase, the water being present in an amount within the range of from about 0.2% to about 2.5% based on the solution, and recovering said noble metal catalyst.

9. The process of hydrogenation of an unsaturated organic material containing the hydrocarbon nucleus of a rosin acid compound possessing solubility in acetic acid, said material containing a small proportion of not more than 5% of an impurity selected from the group consisting of aldehydes, ketones, and organic peroxides, which process comprises reacting said organic compound, dissolved in acetic acid, and hydrogen, in contact with a non-colloidal noble metal catalyst, in the presence of water which is dissolved in the acetic acid solution, the water being present in an amount within the range of from about 0.1% to about 5.0% based on the solution, and recovering said noble metal catalyst.

10. The process of hydrogenation of an unsaturated organic material containing the hydrocarbon nucleus of a rosin acid compound possessing solubility in acetic acid, said material containing a small proportion of not more than 5% of an impurity selected from the group consisting of aldehydes, ketones, and organic peroxides, which process comprises reacting said organic compound, dissolved in acetic acid, and hydrogen, in contact with a non-colloidal noble metal catalyst, in the presence of water which is dissolved in the acetic acid solution, the water being present in the amount of about 2.5% based on the solution, and recovering said noble metal catalyst.

11. The process of hydrogenation of an unsaturated organic material containing the hydrocarbon nucleus of a rosin acid compound possessing solubility in acetic acid, said material containing a small proportion of not more than 5% of an impurity selected from the group consisting of aldehydes, ketones, and organic peroxides, which process comprises reacting said organic compound, dissolved in acetic acid, and hydrogen, in contact with a non-colloidal platinum catalyst, in the presence of water which is dissolved in the acetic acid solution, the water being present in the amount of about 2.5% based on the solution, and recovering said noble metal catalyst.

WILLIAM J. KIRKPATRICK.